United States Patent
Zhang et al.

(10) Patent No.: US 10,820,330 B2
(45) Date of Patent: Oct. 27, 2020

(54) SCHEDULING INFORMATION TRANSMITTING METHOD AND APPARATUS IN D2D COMMUNICATION, AND SCHEDULING INFORMATION RECEIVING METHOD AND APPARATUS IN D2D COMMUNICATION

(71) Applicant: Samsung Electronics Co., Ltd., Suwon-si, Gyeonggi-do (KR)

(72) Inventors: Shichang Zhang, Beijing (CN); Yi Wang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 15/746,959

(22) PCT Filed: Aug. 18, 2016

(86) PCT No.: PCT/KR2016/009114
§ 371 (c)(1),
(2) Date: Jan. 23, 2018

(87) PCT Pub. No.: WO2017/030393
PCT Pub. Date: Feb. 23, 2017

(65) Prior Publication Data
US 2020/0084776 A1      Mar. 12, 2020

(30) Foreign Application Priority Data
Aug. 18, 2015   (CN) .......................... 2015 1 0508219

(51) Int. Cl.
*H04L 5/00* (2006.01)
*H04W 72/08* (2009.01)
*H04W 72/04* (2009.01)

(52) U.S. Cl.
CPC ......... *H04W 72/085* (2013.01); *H04L 5/0012* (2013.01); *H04L 5/0082* (2013.01); *H04W 72/044* (2013.01); *H04W 72/048* (2013.01)

(58) Field of Classification Search
CPC combination set(s) only.
See application file for complete search history.

(56) References Cited

U.S. PATENT DOCUMENTS

2016/0183276 A1* 6/2016 Marinier ............... H04W 72/02
                                                                370/329
2016/0205647 A1   7/2016 Seo et al.
(Continued)

FOREIGN PATENT DOCUMENTS

| WO | 2015021185 A1 | 2/2015 |
| WO | 2015-065015 A1 | 5/2015 |
| WO | 2015-080488 A1 | 6/2015 |

OTHER PUBLICATIONS

Huawei et al., "Remaining issues on scheduling assignment T-PRT," R1-143703, 3GPP TSG RAN WG1 Meeting #78bis, Sep. 27, 2014.
(Continued)

*Primary Examiner* — Lakeram Jangbahadur
(74) *Attorney, Agent, or Firm* — Jefferson IP Law, LLP

(57) ABSTRACT

The present invention provides a control information transmission resource determining method in a D2D communication. In this method, a location of a subframe used for a SA transmission is determined in a SA resource pool by a TRP. In the subframe, a frequency domain resource used for the SA transmission occupies a part of symbols or PRBs in the entire subframe, and a location of the frequency domain resource is determined by a central control node assigning way, a randomly selecting way, a resource-hopping way or a mapping way between a time domain resource and a frequency domain resource. According to the method above, data transmission delay can be effectively reduced, data
(Continued)

transmission reliability can be ensured, and V2X communication requirements can be achieved by small changes in a current system.

14 Claims, 4 Drawing Sheets

(56) References Cited

U.S. PATENT DOCUMENTS

| | | | |
|---|---|---|---|
| 2016/0249355 A1* | 8/2016 | Chae | H04W 72/1263 |
| 2016/0302223 A1* | 10/2016 | Song | H04W 72/1263 |
| 2017/0142741 A1* | 5/2017 | Kaur | H04W 56/002 |
| 2017/0245282 A1* | 8/2017 | Lee | H04W 52/24 |
| 2017/0272299 A1* | 9/2017 | Chae | H04W 52/54 |
| 2018/0132136 A1* | 5/2018 | Lu | H04W 28/065 |
| 2019/0261442 A1* | 8/2019 | Yoon | H04W 8/005 |

OTHER PUBLICATIONS

Nokia Networks et al., "Scheduling Assignment design for D2D communications," R1-144166, 3GPP TSG RAN WG1 Meeting #79, Sep. 27, 2014.

* cited by examiner

SCHEDULING INFORMATION TRANSMITTING METHOD AND APPARATUS IN D2D COMMUNICATION, AND SCHEDULING INFORMATION RECEIVING METHOD AND APPARATUS IN D2D COMMUNICATION

TECHNICAL FIELD

The present invention relates to mobile communication technology fields, and more particularly, to a scheduling information transmitting method and apparatus in a D2D communication, and a scheduling information receiving method and apparatus in a D2D communication.

BACKGROUND ART

At present, a D2D communication technology has been accepted by 3GPP standards based on its great potential values in public security fields and civil communication fields, and a part of functions have been standardized in 3 GPP Rel-12, which includes discovering each other among D2D terminals in a In Coverage (IC) scenario, and broadcast communication among D2D terminals in a IC scenario, a Partial Coverage (PC) scenario and an Out of Coverage (OC) scenario.

At present, two D2D broadcast communication modes have been defined in 3GPP Rel-12 standards, which are referred to as mode 1 and mode 2. For mode 1, it is required that a UE transmitting a D2D broadcast is an In Coverage UE (ICUE) of a cellular network. The UE obtains configuration information of a D2D scheduling Assignment (SA) resource pool by receiving a system broadcast signaling transmitted from an eNB, wherein the configuration information includes a SA period and locations of subframes used for SA transmissions in each period. If the UE supporting broadcast communication mode 1 has data to be transmitted, the UE requests the communication resource specifically used for mode 1 to the eNB through a specific Buffer Status Report (BSR). Afterwards, the UE detects an eNB's D2D Grant before each SA period to obtain a location of a resource used for a SA transmission and a location of a resource used for a data transmission. For mode 1, resource conflict between different UEs can be avoided by using eNB centralized control.

The UE transmitting the D2D broadcast through mode 2 may be an ICUE, or may be an Out of Coverage UE (OCUE) of the cellular network. The ICUE obtains SA resource pool configuration and corresponding data resource pool configuration by receiving the system broadcast signaling from the eNB, and randomly selects a SA transmission resource and a data transmission resource in each SA period. The OCUE determines the SA resource pool configuration for mode 2 and the corresponding data resource pool configuration through pre-configuration information, and a resource selection way for the OCUE is same as that for the ICUE. In the PC scenario, for mode 2, the resource pool configuration pre-configured for the OCUE is related with carriers, system bandwidth and/or TDD configuration of cells to which ICUEs participating in the D2D broadcast communication.

For the two D2D broadcast communication modes, the SA resource pool may be bound with the data source pool or a data resource. In each SA period, a location of the SA resource pool is in front of the corresponding data resource pool or the corresponding data resource, and does not overlap with the corresponding data resource pool or the corresponding data resource. In addition, D2D terminals works on a half-duplex mode, thus, the terminal being performing transmission for another terminal cannot simultaneously receive a signaling from the another terminal. In Rel-12, the half-duplex limitation can be solved through a resource-hopping way.

In each SA period, each SA is transmitted twice, and a time-frequency resource for a first transmission is as follows:

$n_{t_1} = \mathrm{mod}(s, N_t)$, $n_{f_1} = \mathrm{floor}(s/N_t)$;

a time-frequency resource for a second transmission is as follows:

$n_{t_2} = \mathrm{mod}(s + \mathrm{mod}(n_{f_1}, N_s) + 1, N_t)$, $n_{f_2} = \mathrm{floor}(N_f/2) + n_{f_1}$;

wherein s is a SA resource index, $N_t$ is the number of subframes in the SA resource pool, $N_f$ is the number of PRBs in the SA resource pool, $N_s = N_f - 1$. According to the resource-hopping way, if the first transmissions of SAs are in a same subframe, a subframe offset occurs for the second transmissions of the SAs, an offset magnitude is related with frequency domain locations of resources for the first transmissions, so as to ensure that if the first transmissions of the SAs are in a same subframe, the second transmissions of the SAs are in different subframes. In addition, two transmissions can ensure SA reception reliability.

Data scheduled by the SA is transmitted four times, locations of subframes for the four data transmissions are determined by a Time Resource Pattern (TRP), and an index of the TRP used for the data transmissions is indicated by the SA. A receiving terminal determines a relation between a TRP index and a TRP by receiving a cell signaling or by pre-configuration. The TRP is denoted as a bit sequence of which the length is $N_{TRP}$. If a subframe set used for data transmissions in the SA period is $\{l_0, l_1, l_2, \ldots, l_{L_{Data}-1}\}$, the TRP corresponding to the TRP index indicated in the current SA is $\{b_0, b_1, b_2, \ldots, b_{N_{TRP}-1}\}$ and $b_{j \bmod N_{TRP}} = 1$, a subframe $l_j$ is used for the data transmission scheduled by the SA. Since locations of subframes corresponding to different TRPs are completely different, terminals using different TRPs for data transmissions have opportunities to receive data from each other. In addition, similarly as that in the SA transmission, four transmissions can ensure a bit-error rate of data reception for the receiving terminal.

It can be seen from above that, in order to solve half-duplex limitation and to ensure reception reliability requirements, the SA transmission resource does not overlay with the data transmission. In particular, the SA transmission resource is in front of the scheduled data transmission resource, and the used resource-hopping way for the SA transmission is different from that used for the data transmission. Thus, reception complexity of the receiving terminal can be reduced. However, the data transmission delay is increased.

The D2D communication standardized in 3GPP Rel-12 is mainly for low speed terminals and services having low delay sensitivity requirements and low receiving reliability requirements. Thus, the implemented D2D functions are far from user's requirements. In subsequent versions, various communication terminal manufacturers and various communication network device manufacturers have reached a consensus on further enhancement of the D2D functional framework. Based on the current D2D broadcast communication mechanism, a function of supporting direct communication of satisfying low delay and high reliability requirements between high-speed devices, between a high-speed device and a low-speed device and between a high-speed device and a stationary device, i.e., Vehicle to Vehicle/Pedestrian/Infrastructure/Network (V2X), is one of preferably-standardized functions.

Compared with the current D2D communication, the V2X communication has a higher delay requirement and a higher reliability requirement, which are strongest differences from the current D2D communication. In particular, the 3GPP has clearly put forward that the smallest delay requirement for the V2X communication is 20 ms, but has not clearly put forward the high reliability requirement. However, the two aspects are not mainly-considered factors during a current D2D design process. For example, in the current D2D communication mechanism, an absolute time period occupied by the SA resource pool may reach 400 ms at most, and the location of the data resource is always behind the SA resource pool, thereby causing that it is hard to ensure data transmission delay in the D2D communication. In addition, the SA is transmitted twice. For multiple terminals transmitting SAs, if the first transmissions or the second transmissions are in a same subframe, a terminal in the terminals at most have an opportunity to receive the SA from another terminal in the terminals, which will seriously impact SA reception reliability. In addition, since multiple data transmissions may be scheduled in each SA period through the SA, compared with the SA reception reliability, the data reception reliability may be further reduced.

DISCLOSURE OF INVENTION

Technical Problem

The current D2D communication mechanism has some disadvantages in a data transmission delay aspect and a transmission reliability aspect, and cannot satisfy the low-delay requirement and the high-reliability requirement of the V2X communication.

Solution to Problem

The present invention provides scheduling information transmitting methods and apparatuses in a D2D communication, so as to solve at least one of technology problems above. The method includes:

determining, by a user equipment (UE), a period of a SA transmission resource pool and locations of subframes in the SA transmission resource pool in each period;

determining, by the UE, a location of a subframe used for each $SA_i$ transmission in the SA transmission resource pool according to an index of a time resource pattern $TRP_i$, determining a location of a frequency domain resource in the location of the subframe $s_m^{SA_i}$, used for the $SA_i$ transmission; and performing, by the UE, the $SA_i$ transmission according to the determined location of the subframe and the determined location of the frequency domain resource, wherein i is an index number of SA, m is an index of the number of times that the $SA_i$ is transmitted.

Preferably, the UE determines the period of the SA transmission resource pool and the locations of the subframes in the SA transmission resource pool in each period according to a configuration signaling received from a central control node, or according to pre-configuration, or according to pre-setting.

Preferably, the index of the TRP is assigned by a central control node, or before determining the location of the subframe used for each $SA_i$ transmission, the method further includes: determining, by the UE, an available TRP set; selecting, by the UE, the index of the TRP from the available TRP set.

Preferably, determining the location of the subframe used for each $SA_i$ transmission comprises: determining that all or a part of subframes indicated by the index of the TRP is respectively used for each $SA_i$ transmission.

Preferably, determining the location of the frequency domain resource used for the $SA_i$ transmission comprises:

for each $SA_i$ transmission, determining a frequency domain resource index, determining a SA frequency domain resource corresponding to the frequency domain resource index in a set $F_{SA}$ in the subframe for the current transmission of the $SA_i$ according to a relationship between the SA frequency domain resource and the frequency domain resource index, taking the determined SA frequency domain resource as the frequency domain resource for the current transmission of the $SA_i$;

wherein the set $F_{SA}$ is a set composed by resource elements (REs) used for the SA transmission in the subframe, and the set $F_{SA}$ comprises some SA frequency domain resources.

Preferably, the set $F_{SA}$ comprises consecutive $F_f$ REs in $U_t$ symbols, the SA frequency domain resource comprises some SA resource units, and a SA resource unit comprises $U_f$ REs in all $U_t$ symbols in the $F_{SA}$, or the set $F_{SA}$ comprises consecutive $F_p$ PRBs, the SA frequency domain resource comprises some SA resource units, and a SA resource unit comprises $U_{SA}$ PRBs in the $F_{SA}$, wherein $F_p$ and $U_{SA}$ are pre-set positive integers.

Preferably, for a $SA_i$ first transmission, the frequency domain resource index is determined by receiving an instruction from the central control node, or by independent selection by the UE, or according to the index of the TRP and a configured mapping relationship between a time domain resource and a frequency domain resource;

for a $SA_i$ retransmission, the frequency domain resource index corresponding to the frequency domain resource for the current transmission of the $SA_i$ is determined according to a frequency domain resource index determined for the previous transmission of the $SA_i$ and a configured resource-hopping way; or the frequency domain resource index corresponding to the frequency domain resource for the current transmission of the $SA_i$ is determined according to the index of the $TRP_i$ and the configured mapping relationship between the time domain resource and the frequency domain resource.

Preferably, the frequency domain resource index $n_{TRP_i}$ is determined as $n_{TRP_i}=(ñ_{TRP_i}+f_{hop}(i)\cdot Ns) \bmod N_F$ according to the configured mapping relationship between the time domain resource and the frequency domain resource, wherein Ns is a fixed value pre-set or indicated by the central control node, $f_{hop}(i)$ is a frequency-hopping factor configured by the central control node or pre-set, $N_F$ is the number of TRPs using the subframe for the current transmission of the $SA_i$ as a transmission subframe, $ñ_{TRP_i}$ is a relative order of the $TRP_i$ after the $N_F$ TRPs are sorted in ascending order or in descending order of the indices of the $N_F$ TRPs;

Preferably, $$f_{hop}(i) = \begin{cases} 0 & Ns = 1 \\ \left(\sum_{k=i\cdot10+1}^{i\cdot10+9} c(k) \times 2^{k-(i\cdot10+1)}\right) \bmod Ns & Ns = 2 \\ \left(\left(\sum_{k=i\cdot10+1}^{i\cdot10+9} c(k) \times 2^{k-(i\cdot10+1)}\right) \bmod(Ns-1) + 1\right) \bmod Ns & Ns > 2 \end{cases}$$

wherein c(k) is a pseudo-random sequence defined in a specification.

Preferably, determining the location of the frequency domain resource used for the $SA_i$ transmission comprises:

for a first $SA_i$ transmission, receiving a physical layer control signaling transmitted from a central control node, wherein the physical layer control signaling indicates all PRBs that the SA frequency domain resource consist of, wherein the SA frequency domain resource is used for the current transmission of the $SA_i$;

for a $SA_i$ retransmission, all PRBs that constitute the SA frequency domain resource used for the current transmission of the $SA_i$ are determined according to the SA frequency domain resource determined for the previous transmission of the $SA_i$ and a configured resource-hopping way;

wherein a set $F_{SA}$ composed by REs used for the SA transmission in a subframe comprises $F_p$ PRBs, the SA frequency domain resource used for each $SA_i$ transmission comprises some SA resource units, a SA resource unit comprises $U_{SA}$ PRBs in the $F_{SA}$, wherein $F_p$ and $U_{SA}$ are pre-set positive integers.

Preferably, determining the location of the frequency domain resource used for the $SA_i$ transmission comprises:

receiving, by the UE, indication information about a location of a frequency domain resource for each $SA_i$ transmission from a central control node before the first $SA_i$ transmission; or receiving, by the UE, indication information about a location of a frequency domain resource for the current transmission of the $SA_i$ from the central control node before each $SA_i$ transmission; or selecting independently, by the UE, the location of the frequency domain resource of each $SA_i$ transmission.

A SA information receiving method in a D2D communication includes:

determining, by a user equipment (UE), a period of a SA reception resource pool and locations of subframes in the SA reception resource pool in each period;

determining, by the UE, locations of frequency domain resources used for SA transmissions; and detecting, by the UE, SA in the subframes of the SA reception resource pool according to the locations of the frequency domain resources.

Preferably, the UE determines the period of the SA reception resource pool and the locations of the subframes in the SA reception resource pool in each period according to a configuration signaling received from a central control node, or according to pre-configuration, or according to pre-setting.

Preferably, after determining the period of the SA reception resource pool and the locations of the subframes in the SA reception resource pool in each period and before determining the locations of the frequency domain resources used for the $SA_i$ transmissions, the method further includes: determining, by the UE, an available TRP set; for a $TRP_j$ in the available TRP set, determining a location of a subframe for each $SA_j$ transmission for which the $TRP_j$ is used;

detecting the $SA_j$ in the subframe indicated by the location of the subframe for each $SA_j$ transmission according to the locations of the frequency domain resources;

wherein j is an index of SA.

Preferably, determining the locations of the frequency domain resources used for the SA transmissions comprises:

for each $SA_j$ transmission, determining a frequency domain resource index, determining a SA frequency domain resource corresponding to the frequency domain resource index in a set $F_{SA}$ in the subframe for the current transmission of the $SA_j$ according to a relationship between the SA frequency domain resource and the frequency domain resource index, taking the determined SA frequency domain resource as the frequency domain resource for the current transmission of the $SA_j$;

wherein the set $F_{SA}$ is a set composed by resource elements (REs) used for the SA transmission in the subframe, and the set $F_{SA}$ comprises some SA frequency domain resources.

Preferably, the set $F_{SA}$ comprises consecutive $F_f$ REs in $U_t$ symbols, the SA frequency domain resource comprises some SA resource units, and a SA resource unit comprises $U_f$ REs in all $U_t$ symbols in the $F_{SA}$, or the set $F_{SA}$ comprises consecutive $F_p$ PRBs, the SA frequency domain resource comprises some SA resource units, and a SA resource unit comprises $U_{SA}$ PRBs in the $F_{SA}$, wherein $F_p$ and $U_{SA}$ are pre-set positive integers.

Preferably, for a $SA_j$ first transmission, the frequency domain resource index is determined by receiving an instruction from the central control node, or by independent selection by the UE, or according to the index of the $TRP_j$ and a configured mapping relationship between a time domain resource and a frequency domain resource;

for a $SA_j$ retransmission, the frequency domain resource index corresponding to the frequency domain resource for the current transmission of the $SA_j$ is determined according to a frequency domain resource index determined for the previous transmission of the $SA_j$ and a configured resource-hopping way; or the frequency domain resource index corresponding to the frequency domain resource for the current transmission of the $SA_j$ is determined according to the index of the $TRP_j$ and the configured mapping relationship between the time domain resource and the frequency domain resource.

Preferably, the frequency domain resource index $n_{TRP_j}$ is determined as $n_{TRP_j} = (\tilde{n}_{TRP_j} + f_{hop}(j) \cdot Ns) \bmod N_F$ according to the configured mapping relationship between the time domain resource and the frequency domain resource, wherein Ns is a fixed value pre-set or indicated by the central control node, $f_{hop}(j)$ is a frequency-hopping factor configured by the central control node or pre-set, $N_F$ is the number of TRPs using the subframe for the current transmission of the $SA_j$ as a transmission subframe, $\tilde{n}_{TRP_j}$ is a relative order of the $TRP_j$ after the $N_F$ TRPs are sorted in ascending order or in descending order of the indices of the $N_F$ TRPs;

Preferably, $$f_{hop}(j) = \begin{cases} 0 & Ns = 1 \\ \left(\sum_{k=j\cdot10+1}^{j\cdot10+9} c(k) \times 2^{k-(j\cdot10+1)}\right) \bmod Ns & Ns = 2 \\ \left(\left(\sum_{k=j\cdot10+1}^{j\cdot10+9} c(k) \times 2^{k-(j\cdot10+1)}\right) \bmod(Ns-1) + 1\right) \bmod Ns & Ns > 2 \end{cases}$$

wherein c(k) is a pseudo-random sequence defined in standards.

Preferably, if the resource for the $SA_j$ retransmission is determined according to the resource-hopping way or the mapping way between the time domain resource and the frequency domain resource, when the $SA_j$ is detected, combined detection is performed for frequency domain resources respectively in subframes indicated by the locations of the subframes for the $SA_j$ transmissions.

A SA information transmitting apparatus in a D2D communication includes:

a resource pool determining module, to determine a period of a SA transmission resource pool and locations of subframes in the SA transmission resource pool in each period;

a time-frequency resource location determining module, to determine a location of a subframe used for each $SA_i$ transmission in the SA transmission resource pool according to an index of a time resource pattern $TRP_i$, determine a location of a frequency domain resource in the location of the subframe $s_m^{SA_i}$ used for the $SA_i$ transmission; and a transmission module, to perform the $SA_i$ transmission according to the determined location of the subframe and the determined location of the frequency domain resource, wherein i is an index number of SA, m is an index of the number of times that the $SA_i$ is transmitted.

A SA information receiving apparatus in a D2D communication includes:

a resource pool determining module, to determine a period of a SA reception resource pool and locations of subframes in the SA reception resource pool in each period;

a time-frequency resource location determining module, to determine locations of frequency domain resources used for SA transmissions; and a detecting module, to detect SA in the subframes of the SA reception resource pool according to the locations of the frequency domain resources.

It can be seen from the technical solutions of this present invention that, a location of a subframe used for a SA transmission is determined in a SA resource pool by a TRP, in the subframe, a frequency domain resource used for the SA transmission occupies a part of symbols or PRBs in the entire subframe, and a location of the frequency domain resource is determined by a central control node assigning way, a randomly selecting way, a resource-hopping way or a mapping way between a time domain resource and a frequency domain resource.

Advantageous Effects of Invention

According to the method and apparatus in D2D communication of the present disclosure, data transmission delay can be effectively reduced, data transmission reliability can be ensured, and V2X communication requirements can be achieved by small changes in a current system.

MODE FOR THE INVENTION

The present invention will be described in further detail hereinafter with reference to accompanying drawings and embodiments to make the objective, technical solution and merits therein clearer.

Figure 1:
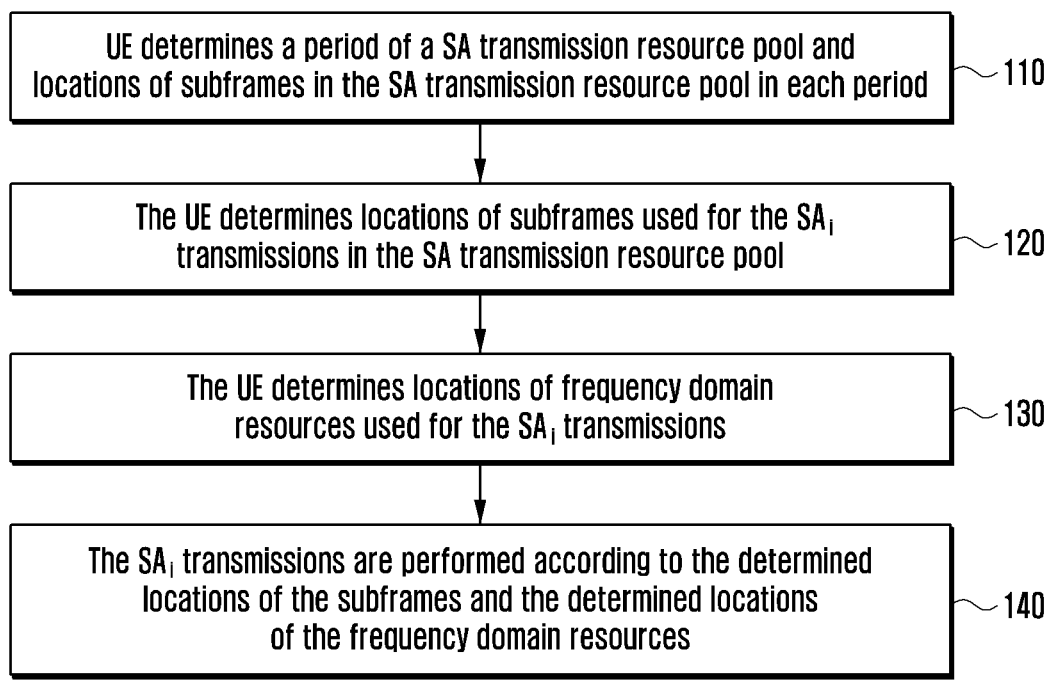
FIG. 1 is a schematic diagram illustrating a SA transmitting method implemented by a transmitting UE according to some embodiments of the present invention.

Compared with current D2D communication, V2X communication has high requirements for data transmission delay and data transmission reliability. At present, the D2D communication mechanism has some disadvantages for SA resource allocation ways, data resource allocation ways, SA resource hopping ways and data resource hopping ways, thus, cannot satisfy a low-delay requirement and a high-reliability requirement in some conditions. Thus, the present invention provides a SA information transmitting method. As shown in FIG. 1, according to procedures in blocks as follows, a transmitting UE determines transmission resources for $SA_i$, and performs $SA_i$ transmissions on the determined transmission resources.

At block 110, the UE determines a period of a SA transmission resource pool and locations of subframes in the SA transmission resource pool in each period.

The UE may determine the information above by receiving a configuration signaling from a central control node (e.g., an eNB or a roadside node) or by pre-configuration or by pre-setting (e.g., definition in a specification). The period of the SA transmission resource pool is denoted as P. In each period, the SA transmission resource pool includes a subframe set $SRP=\{s_0, s_1, s_2, \ldots, s_{N_{Tx}-1}\}$, wherein $N_{Tx}$ denotes the number of subframes in the SA transmission resource pool in each period. A set $F_{SA}$ includes Resource Elements (REs) that can be used for SA transmissions in each subframe in the set $S_{RP}$. Frequency domain resources used for SA transmissions as follows are determined in the set $F_{SA}$.

At block 120, the UE determines locations of subframes used for the $SA_i$ transmissions in the SA transmission resource pool.

In the SA transmission resource pool determined in block 110, the UE determines a location of a subframe used for each $SA_i$ transmission according to an index of a TRP. In particular, the locations of the subframes for the $SA_i$ transmissions are indicated by $TRP_i$. An index of the $TRP_i$ may be allocated by the central control node, or is selected by the transmitting UE. If the index of the $TRP_i$ is selected by the transmitting UE, the UE further determines an available TRP set. The available TRP set may be determined by receiving the configuration signaling from the central control node or by pre-configuration or by pre-setting (e, g., definition in a specification). The subframes actually used for the $SA_i$ transmissions may be a part of subframes indicated by the $TRP_i$. A subframe set used for the $SA_i$ transmissions is denoted as $S_{SA}=\{s_0^{SA_i}, s_1^{SA_i}, s_2^{SA_i}, \ldots, s_{N_{SA}-1}^{SA_i}\}$, wherein $N_{SA}$ is a maximum SA transmission number.

At block 130, the UE determines locations of frequency domain resources used for the $SA_i$ transmissions.

On the location of the subframe $s_m^{SA_i}$ for each $SA_i$ transmission determined in block 120, the UE determines a location of a frequency domain resource used for this $SA_i$ transmission. In particular, the frequency domain resource for the m-th $SA_i$ transmission is in the subframe $s_m^{SA_i}$, and includes $M_{SA}$ SA resource units, wherein a value of $M_{SA}$ may be configured by the central control node, or may be selected by the UE, or may be defined in a specification, and the value of the $M_{SA}$ may be equal to 1. The detail the location of the frequency domain resource may be indicated by the central control node, or may be selected by the UE.

It should be noted that an execution order of procedures in blocks above is not limited in the present invention.

At block 140, the $SA_i$ transmissions are performed according to the determined locations of the subframes and the determined locations of the frequency domain resources.

Figure 2:
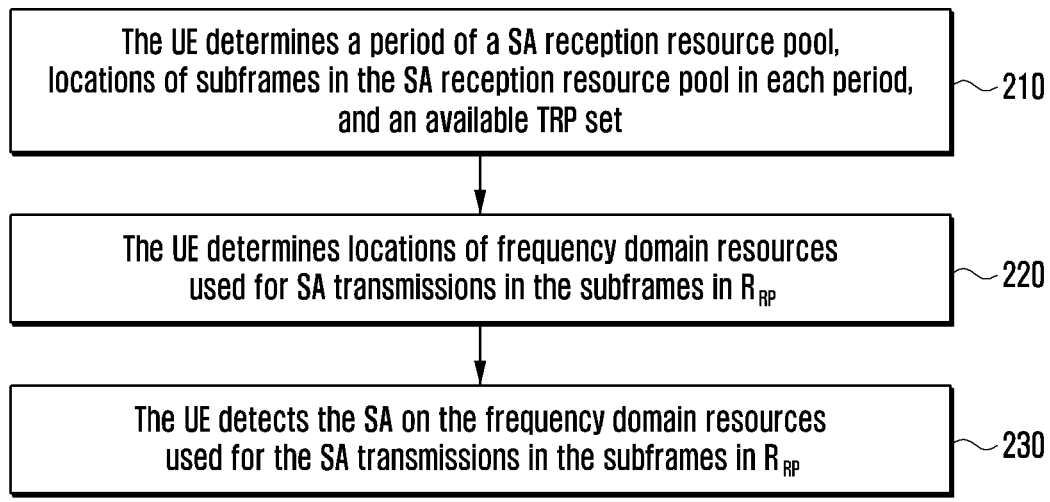
FIG. 2 is a schematic diagram illustrating a SA receiving method implemented by a receiving UE according to some embodiments of the present invention.

As shown in FIG. 2, a receiving UE receives SA according to procedures in blocks as follows.

At block 210, the UE determines a period of a SA reception resource pool, locations of subframes in the SA reception resource pool in each period, and an available TRP set.

The UE may determine the information above by receiving a configuration signaling from a central control node or by pre-configuration or by definition in a specification. A subframe set in the SA reception resource pool in each period is $R_{RP}=\{r_0, r_1, r_2, \ldots, r_{N_{Rx}-1}\}$, wherein $N_{Rx}$ denotes the number of subframes in the SA reception resource in each period.

At block 220, the UE determines locations of frequency domain resources used for SA transmissions in the subframes in $R_{RP}$.

The UE may determine the information above by receiving the configuration signaling from the central control node or by pre-configuration or by definition in a specification.

At block 230, the UE detects the SA on the frequency domain resources used for the SA transmissions in the subframes in $R_{RP}$.

The subframes used for the SA transmissions are a subset of $R_{RP}$.

A frequency domain resource for a single SA transmission includes $M_{SA}$ SA resource units, a value of $M_{SA}$ may be configured by the central control node, or may be selected by the UE, or may be defined in a specification, and the value of the $M_{SA}$ may be equal to 1.

It should be noted that an execution order of procedures in blocks above is not limited in the present invention.

In order to facilitate understanding of the present invention, the present invention will be illustrated in detail according to an interactive mode between equipments hereinafter with reference to the accompanying detail application condition.

First Embodiment

In this embodiment, a transmitting UE receives an instruction from a central control node, or performs independent selection to determine an index of a TRP and/or an index of a frequency domain resource for SA transmissions. Afterwards, the transmitting UE determines locations of time-frequency resources for the SA transmissions according to the TRP index and a mapping method between a time domain resource and a frequency domain resource. Alternatively, the transmitting UE determines a location of a time-frequency resource for a first transmission according to the index of the TRP for the SA and the index of the frequency domain resource for the SA, and then determines locations of resources for retransmissions according to a pre-set resource-hopping rule. The method in this embodiment includes procedures as follows.

At block 310, the UE determines a period P, $S_{RP}$ and a $TRP_i$ of a SA resource pool.

In this embodiment, the transmitting UE may obtain the period P and $S_{RP}$ by receiving a broadcast message or a dedicated message from a central control node. Alternatively, the transmitting UE may obtain the three parameters above according to definition in a specification or according to pre-configuration.

In this embodiment, the UE may determine a value of the $TRP_i$ by receiving the dedicated control signaling from the central control node or by independent selection from an available TRP set. If the independent selection is performed from the available TRP set, the available TRP set may be pre-determined. In particular, the UE may obtain the available TRP set by receiving the broadcast message or the dedicated message from the central control node.

At block 320, the UE determines a location of a frequency domain resource for the first $SA_i$ transmission.

Resources that can be used for the SA transmission in a subframe compose a set denoted as $F_{SA}$. The set $F_{SA}$ includes some SA frequency domain resources, and each of the SA frequency domain resources includes $M_{SA}$ SA resource units. One SA frequency domain resource is used for each $SA_i$ transmission. A method for determining a location of a time-frequency resource for the first $SA_i$ transmission in this embodiment is described in detail as follows.

In particular, in this embodiment, the frequency domain resource for the first $SA_i$ transmission is in a subframe $s_0^{SA_i}$, wherein the $M_{SA}$ may be a fixed value defined in a specification, or may be configured by the central control node, or may be independently determined by the UE. At least one location of at least one SA resource unit corresponding to the SA frequency domain resource used for this transmission may be defined in a specification, or may be indicated by the central control node, or may be independently determined by the UE.

Figure 3:
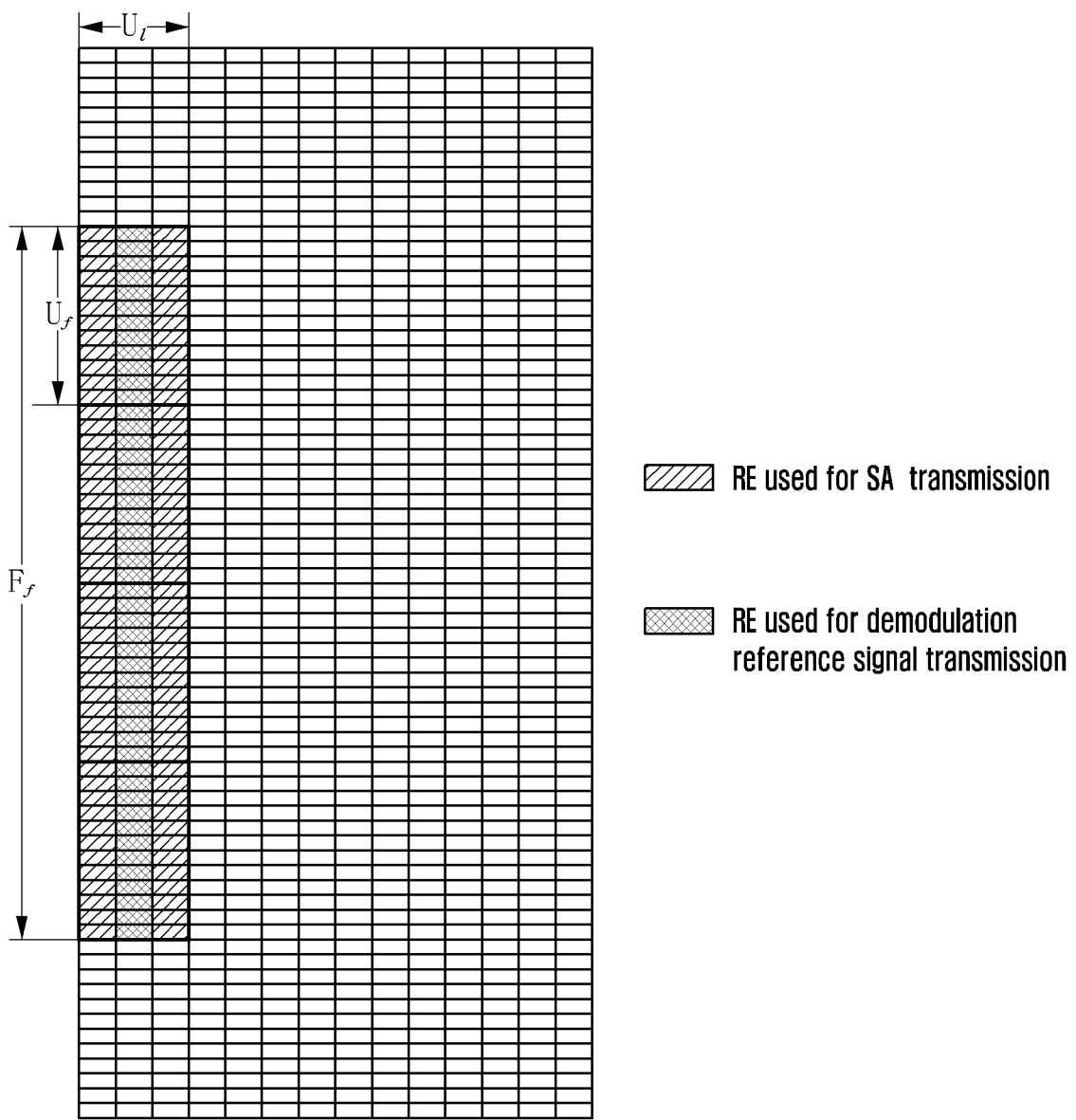
FIG. 3 is a schematic diagram illustrating a SA resource unit when $U_f=12$, $U_t=3$ according to some embodiments of the present invention.

According to an implementing way of the present invention (a first implementing way), the $F_{SA}$ includes consecutive $F_f$ REs in $U_t$ symbols. A SA resource unit of which a value of an index is I in any subframe in $S_{SA}$ includes consecutive $U_f$ REs in the $U_t$ symbols in $F_{SA}$, and frequency domain indices of the REs in the SA resource unit are $U_f \times I \sim U_f \times (I+1)-1$. At least one of the $U_t$ symbols in the SA resource unit may be used for demodulation reference signal transmission, and other symbols are used for SA information transmission. As shown in FIG. 3, a possible way is $U_f=12$, $U_t=3$, the $U_f$ REs in the symbol of which the symbol index is 1 is used for the demodulation reference signal transmission.

Figure 4:
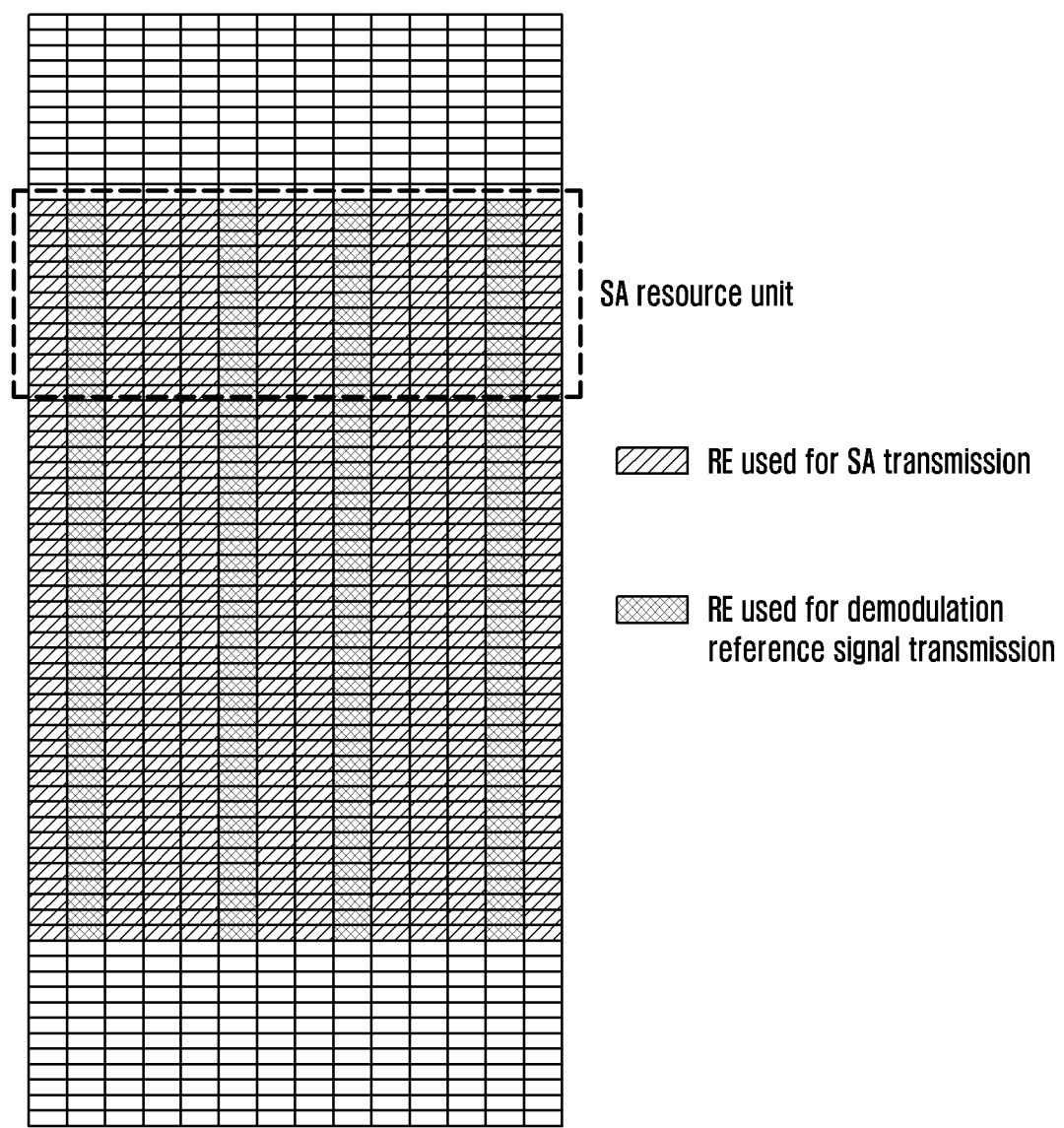
FIG. 4 is a schematic diagram illustrating a SA resource unit when $U_{SA}=1$ according to some embodiments of the present invention.

According to another implementing way (a second implementing way), $F_{SA}$ includes $F_p$ PRBs, the $F_p$ PRBs may be consecutive or non-consecutive in the frequency domain, and a SA resource unit includes $U_{SA}$ PRBs, wherein $1 \leq U_{SA}$, a value of the $U_{SA}$ is defined in a specification. At least one symbol in the SA resource unit used for a same SA transmission may be used for the demodulation reference signal transmission. A possible way includes that the $F_{SA}$ includes consecutive $F_p$ PRBs, wherein $U_{SA}=1$, and first, fifth, eighth and twelfth symbols are used for the demodulation reference signal transmission. As shown in FIG. 4, according to the first implementing way and the second implementing way, each SA frequency domain resource in the $F_{SA}$ corresponds to a unique frequency domain resource index, and the UE may determine the relationship above according to configuration of the central node, pre-configuration or definition in a specification. The index of the frequency domain resource used for the $SA_i$ transmission may be indicated by the central control node or may be independently determined by the UE. Alternatively, according to the $TRP_i$ determined in block 310, the index of the frequency domain resource used for the $SA_i$ transmission is uniquely determined through a mapping way between a time domain resource and a frequency domain resource. In particular, some subframes used for $SA_i$ transmissions are determined according to the $TRP_i$. For each subframe F in the subframes, if the current subframe F is a transmission subframe of $N_{TRP}$ TRPs in the available TRP set according to the configuration for the available TRP set in block 310 (i.e., for $N_F$ TRPs in the TRP set, the current subframe F is a determined transmission subframe for the corresponding TRPs), the $N_F$ TRPs are sorted in ascending order or in descending order of values of indices of the $N_F$ TRPs, and then a relative order of the $TRP_i$ $ñ_{TRP_i}$ is determined. If it is assumed that the total number of the SA frequency domain resources in the current subframe F is equal to $N_F$, the index of the frequency domain resource for the $SA_i$ transmission $n_{TRP_i}$ is as follows:

$$n_{TRP_i} = (ñ_{TRP_i} + f_{hop}(i) \cdot Ns) \bmod N_F$$

wherein Ns is a fixed value defined in a specification or configured by the central control node, Ns may be $N_{TRP}/4$; $f_{hop}(i)$ is a frequency-hopping factor defined in a specification or configured by the central control node, and $f_{hop}(i)$ may be as follows:

$$f_{hop}(i) = \begin{cases} 0 & Ns = 1 \\ \left(\sum_{k=i\cdot 10+1}^{i\cdot 10+9} c(k) \times 2^{k-(i\cdot 10+1)}\right) \bmod Ns & Ns = 2 \\ \left(\left(\sum_{k=i\cdot 10+1}^{i\cdot 10+9} c(k) \times 2^{k-(i\cdot 10+1)}\right) \bmod (Ns-1) + 1\right) \bmod Ns & Ns > 2 \end{cases}$$

wherein c(k) is a pseudo-random sequence defined in a specification. According to this method, information bits carried in the SA may not include indication bits of the TRP index.

For the second implementing way, another method for determining a frequency domain resource used for the $SA_i$ transmission includes that the central control node indicates resources used for the SA transmission and the data transmission through a physical control channel In this method, the number of bits used for indicating the SA resource and the data resource in the physical control channel may be $$\left\lceil \log_2\left(\binom{\lceil N_{RB}^{UL}/P+1 \rceil}{3}\right)\right\rceil,$$

and the bits correspond to a starting position of the SA resource, a starting position and an ending position of the data resource.

At block 330, the UE determines locations of frequency domain resources used for $SA_i$ retransmissions.

The resources for the $SA_i$ retransmissions are in the corresponding subframes in a set $\{s_1^{SA_i}, s_2^{SA_i}, \ldots, s_{N_{SA}-1}^{SA_i}\}$, and are respectively used for a first, a second, ..., and a $N_{SA}$-th re-transmission.

According to an implementing way in this embodiment, a location of a frequency domain resource for a $SA_i$ re-transmission is determined according to a location of a frequency domain resource for a previous transmission and a resource-hopping mode. For example, if the $SA_i$ is previously transmitted on the SA frequency domain resource of which the frequency domain resource index is $n_l$, the index of the frequency domain resource used for this $SA_i$ transmission is determined as $n_{l+1}=n_l+\delta$ according to the resource hopping mode, wherein δ may be a fixed value defined in a specification or configured by the central control node, or may be a random value defined in a specification or configured by the central control node. For another example, corresponding to all PRBs that constitute the SA frequency domain resource used for the previous transmission of the SA, all PRBs that constitute the SA frequency domain resource used for the next transmission of the SA is determined according to the resource-hopping mode.

According to another implementing way of the present invention, the index of the SA frequency domain resource for the $SA_i$ transmission is determined according to the mapping way between the time domain resource and the frequency domain resource in block 320.

So far, the embodiment ends. According to the method in this embodiment, the time-frequency resources for multiple $SA_i$ transmissions are known for a receiving terminal, thereby facilitating reception and combination of the receiving terminal and improving SA reception reliability.

Second Embodiment

In this embodiment, a transmitting UE receives an instruction from a central control node, or performs independent selection to determine an index of a TRP for SA transmissions and/or an index of a frequency domain resource for each SA transmission. And the transmitting UE determines locations of time-frequency resources for the SA transmissions according to the TRP index and a mapping method between a time domain resource and a frequency domain resource. The method in this embodiment includes procedures as follows.

At block 410, the UE determines a period P, $S_{RP}$ and $TRP_i$ of a SA resource pool.

In this embodiment, the transmitting UE may obtain the period P and $S_{RP}$ by receiving a broadcast message or a dedicated message from a central control node. Alternatively, the transmitting UE may obtain the three parameters above according to definition in a specification or according to pre-configuration.

In this embodiment, the UE may determine a value of the $TRP_i$ by receiving the dedicated control signaling from the central control node or by independent selection from an available TRP set. If the independent selection is performed from the available TRP set, the available TRP set may be pre-determined. In particular, the UE may obtain the available TRP set by receiving the broadcast message or the dedicated message from the central control node.

At block 420, the UE determines the location of the frequency domain resource for each $SA_i$ transmission.

In this embodiment, the frequency domain resource for each $SA_i$ transmission is in a corresponding subframe in a subframe set $S_{SA}$, $M_{SA}$ may be a fixed value defined in a specification, or may be configured by the central control node, or may be independently determined by the UE. At least one location of at least one SA transmission unit corresponding to the frequency domain resource may be defined in a specification, or may be indicated by the central control node, or may be independently determined by the UE.

In this embodiment, the UE may determine the location of the frequency domain resource for each $SA_i$ transmission (e.g., a frequency domain resource index in the first embodiment) by receiving a signaling from the central control node. If a value of $N_{SA}$ is more than 1, the UE may receive the signaling from the central control node before the first $SA_i$ transmission, may obtain locations of frequency domain resources of all $N_{SA}$ transmissions according to indication information about the locations of the frequency domain resources for all the $N_{SA}$ transmissions. Alternatively, the UE may receive the signaling from the central control node before each transmission, and may obtain the location of the frequency domain resource for this transmission according to indication information about the location of the frequency domain resource for this transmission. In addition, the UE may determine the location of the frequency domain resource for each $SA_i$ transmission through an independently selection way; when the value of $N_{SA}$ is more than 1, an order that the UE determines the locations of the frequency domain resources for the $SA_i$ transmissions is not limited in the present invention.

According to an implementing way of the present invention, the $F_{SA}$ includes consecutive $F_f$ REs in $U_t$ symbols. A SA resource unit of which a value of an index is I in any subframe in the $S_{SA}$ includes consecutive $U_f$ REs in the $U_t$ symbols in $F_{SA}$, and frequency domain indices of the REs in the SA resource unit are $U_f \times I \sim U_f \times (I+1)-1$. At least one of the $U_t$ symbols in the SA resource unit may be used for demodulation reference signal transmission, and other symbols are used for the SA information transmission. As shown in FIG. 3, a possible way is $U_f=12$, $U_t=3$, the $U_f$ REs in the symbol of which the symbol index is 1 is used for the demodulation reference signal transmission.

According to another implementing way, $F_{SA}$ includes $F_p$ PRBs, the $F_p$ PRBs may be consecutive or non-consecutive in the frequency domain, and a SA resource unit includes $U_{SA}$ PRBs, wherein $1 \leq U_{SA}$, a value of the $U_{SA}$ is defined in a specification. At least one symbol in the SA resource unit used for a same SA transmission may be used for the demodulation reference signal transmission.

So far, the embodiment ends. The method in this embodiment applies to a condition that SA reception reliability can be achieved by transmission once. In this condition, a receiving UE of the SA does not need to store data received in subframes corresponding to the TRP, thereby achieving SA reception accuracy and reducing UE hardware cost.

Third Embodiment

In this embodiment, a receiving UE receives an instruction from a central control node, or performs independent selection to determine a period of a reception resource pool, locations of subframes in the reception resource pool in each period, and an available TRP set. The method in this embodiment includes procedures as follows.

At block 510, the receiving UE determines the period of the reception resource pool, the locations of the subframes in the reception resource pool in each period, and the available TRP set.

The UE may determine the information above by receiving a configuration signaling from an eNB or by pre-configuration or by definition in a specification.

At block 520, the UE determines a location of a subframe for each $SA_j$ transmission for which the $TRP_j$ is used.

A $TRP_j$ is determined in the available TRP set determined in block 510. For the $TRP_j$, the location of the subframe for each $SA_j$ transmission for which the $TRP_j$ is used is determined. The $TRP_j$ belongs to the available TRP set determined in block 510. In particular, the $TRP_j$ may be any of TRPs in the set, or may be any of TPRs in a subset of the set. A $TRP_j$ determining method is not limited in the present invention. The subframes for various $SA_j$ transmissions are all or a part of subframes indicated by the $TRP_j$, a set of subframes for the various transmissions is denoted as $R_{SA}=\{r_0^{SA_j}, r_1^{SA_j}, r_2^{SA_j}, \ldots, r_{N_{SA}-1}^{SA_j}\}$.

At block 530, the UE detects the $SA_j$ on frequency domain resources used for the SA transmissions in the subframes in $R_{SA}$.

For any of the subframes in $R_{SA}$, a method for determining a frequency domain resource for a SA transmission in the subframe may be same as that used in the transmission method in the first embodiment, which is not described repeatedly herein. If resources for SA retransmissions are determined according to a resource-hopping mode or a mapping way between a time domain resource and a frequency domain resource, the receiving UE may perform combined decoding for the frequency domain resources used for the $SA_j$ transmissions in the $R_{SA}$, so as to improve SA reception reliability.

So far, the embodiment ends. It can been seen from above that in the present invention, when receiving the SA information, the receiving UE determines the period of the reception resource pool, the locations of the subframes in the reception resource pool in each period and the available TRP set, determines a location of a subframe for each $SA_j$ transmission for which the $TRP_j$ in the available TRP set is used, determines a location of a frequency domain resource used for a $SA_j$ transmission in the location of the subframe $S_m^{SA_j}$, and detects the $SA_j$ on the location of the frequency domain resource in the subframe used for each $SA_j$ transmission.

Detail implementations for the SA transmitting methods and the SA receiving methods are described above. The present invention further provides SA transmitting apparatuses and SA receiving apparatuses, which can be used for implementing the transmitting methods and the receiving methods above.

The present invention provides a SA information transmitting apparatus. The apparatus includes a resource pool determining module, a time-frequency resource location determining module, and a transmission module.

In particular, the resource pool determining module is to determine a period of a SA transmission resource pool and locations of subframes in the SA transmission resource pool in each period; the time-frequency resource location determining module is to determine a location of a subframe used for each $SA_i$ transmission in the SA transmission resource pool according to an index of a time resource pattern $TRP_i$, determine a location of a frequency domain resource in the location of the subframe $S_m^{SA_i}$ used for the $SA_i$ transmission; and the transmission module is to perform the $SA_i$ transmission according to the determined location of the subframe and the determined location of the frequency domain resource, wherein i is an index number of SA, m is an index of the number of times that the $SA_i$ is transmitted.

The present invention provides a SA information receiving apparatus. The apparatus includes a resource pool determining module, a time-frequency resource location determining module, and a detecting module.

In particular, the resource pool determining module is to determine a period of a SA reception resource pool and locations of subframes in the SA reception resource pool in each period; the time-frequency resource location determining module is to determine locations of frequency domain resources used for SA transmissions; and the detecting module is to detect SA in the subframes of the SA reception resource pool according to the locations of the frequency domain resources.

It can be understood by those skilled in the art that all or part of steps in the method provided by the embodiments of the present invention can be implemented by instructing related hardware by a program, the program may be stored in a computer readable storage medium, and one or combination of above method steps are included when the program is operated.

In addition, various functional modules in the apparatus according to the present invention may be integrated into a processing module, or may exist as various separate physical modules, or two or more modules may be integrated into a module. The integrated module above may be implemented in hardware, or may be implemented as a software functional module. If the integrated module is implemented as the software functional module, and is sold and used as a separate product, the integrated module may be stored in a computer readable storage medium.

The storage medium above includes a read only memory, a disk, a Compact Disc (CD) and so on.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A Scheduling Assignment (SA) information transmitting method in a device to device (D2D) communication, comprising:
   determining, by a user equipment (UE), a period of a SA transmission resource pool and locations of subframes in the SA transmission resource pool in each period;
   determining, by the UE, a location of a subframe used for each $SA_i$ transmission in the SA transmission resource pool according to an index of a time resource pattern $TRP_i$;
   determining a location of a frequency domain resource in the location of the subframe $s_m^{SA_i}$ used for the $SA_i$ transmission;
   determining, by the UE, a location of a frequency domain resource corresponding to a frequency domain resource index in a set $F_{SA}$ in the subframe for the $SA_i$ transmission according to a relationship between the frequency domain resource and the frequency domain resource index, for each $SA_i$; and
   performing, by the UE, the $SA_i$ transmission according to the determined location of the subframe and the determined location of the frequency domain resource,
   wherein i is an index number of SA, m is an index of the number of times that the $SA_i$ is transmitted, the set $F_{SA}$ is a set composed by resource elements (REs) used for the SA transmission in the subframe, and the set $F_{SA}$ comprises at least one frequency domain resources.

2. The method of claim 1, wherein the UE determines the period of the SA transmission resource pool and the locations of the subframes in the SA transmission resource pool in each period according to a configuration signaling received from a central control node, or according to pre-configuration, or according to pre-setting.

3. The method of claim 1, wherein the index of the TRP is assigned by a central control node, or
   before determining the location of the subframe used for each $SA_i$ transmission, the method further comprising: determining, by the UE, an available TRP set; selecting, by the UE, the index of the TRP from the available TRP set.

4. The method of claim 1, wherein determining the location of the subframe used for each $SA_i$ transmission comprises: determining that all or a part of subframes indicated by the index of the TRP is respectively used for each $SA_i$ transmission.

5. The method of claim 1, wherein
   the set $F_{SA}$ comprises consecutive $F_f$ REs in $U_t$ symbols, the frequency domain resource comprises at least one SA resource units, and a SA resource unit comprises $U_f$ REs in all $U_t$ symbols in the $F_{SA}$, or
   the set $F_{SA}$ comprises consecutive $F_p$ PRBs, the frequency domain resource comprises at least one SA resource units, and a SA resource unit comprises $U_{SA}$ PRBs in the $F_{SA}$, wherein $F_p$ and $U_{SA}$ are pre-set positive integers;
   wherein for a $SA_i$ first transmission, the frequency domain resource index is determined by receiving an instruction from the central control node, or by independent selection by the UE, or according to the index of the TRP and a configured mapping relationship between a time domain resource and a frequency domain resource;
   for a $SA_i$ retransmission, the frequency domain resource index corresponding to the frequency domain resource for a current $SA_i$ transmission is determined according to a frequency domain resource index determined for a previous $SA_i$ transmission and a configured resource-hopping way; or the frequency domain resource index corresponding to the frequency domain resource for the current $SA_i$ transmission is determined according to the index of the $TRP_i$ and the configured mapping relationship between the time domain resource and the frequency domain resource,
   wherein the frequency domain resource index $n_{TRP_i}$ is determined as $n_{TRP_i} = (\tilde{n}_{TRP_i} + f_{hop}(i) \cdot Ns) \bmod N_F$ according to the configured mapping relationship between the time domain resource and the frequency domain resource, wherein Ns is a fixed value pre-set or indicated by the central control node, $f_{hop}(i)$ is a frequency-hopping factor configured by the central control node or pre-set, $N_F$ is the number of TRPs using the subframe for the current $SA_i$ transmission as a transmission subframe, $\tilde{n}_{TRP_i}$ is a relative order of the $TRP_i$ after the $N_F$ TRPs are sorted in ascending order or in descending order of the indices of the $N_F$ TRPs;
   wherein $$f_{hop}(i) = \begin{cases} 0 & Ns = 1 \\ \left( \sum_{k=i\cdot 10+1}^{i\cdot 10+9} c(k) \times 2^{k-(i\cdot 10+1)} \right) \bmod Ns & Ns = 2 \\ \left( \left( \sum_{k=i\cdot 10+1}^{i\cdot 10+9} c(k) \times 2^{k-(i\cdot 10+1)} \right) \bmod(Ns-1) + 1 \right) \bmod Ns & Ns > 2 \end{cases}$$

wherein c(k) is a pseudo-random sequence defined in a specification.

6. The method of claim 1, wherein determining the location of the frequency domain resource used for the $SA_i$ transmission comprises:
   for a first $SA_i$ transmission, receiving a physical layer control signaling transmitted from a central control node, wherein the physical layer control signaling indicates all PRBs that the frequency domain resource consist of, wherein the frequency domain resource is used for a current $SA_i$ transmission;
   for a $SA_i$ retransmission, all PRBs that constitute the frequency domain resource used for the current $SA_i$ transmission are determined according to the frequency domain resource determined for a previous $SA_i$ transmission and a configured resource-hopping way;

wherein a set $F_{SA}$ composed by REs used for the SA transmission in a subframe comprises $F_p$ PRBs, the frequency domain resource used for each $SA_i$ transmission comprises at least one SA resource units, a SA resource unit comprises $U_{SA}$ PRBs in the $F_{SA}$, wherein $F_p$ and $U_{SA}$ are pre-set positive integers.

7. The method of claim 1, wherein determining the location of the frequency domain resource used for the $SA_i$ transmission comprises:
   receiving, by the UE, indication information about a location of a frequency domain resource for each $SA_i$ transmission from a central control node before the first $SA_i$ transmission; or
   receiving, by the UE, indication information about a location of a frequency domain resource for a current $SA_i$ transmission from the central control node before each $SA_i$ transmission; or
   selecting independently, by the UE, the location of the frequency domain resource of each $SA_i$ transmission.

8. A Scheduling Assignment (SA) information receiving method in a device to device (D2D) communication, comprising:
   determining, by a user equipment (UE), a period of a SA reception resource pool and locations of subframes in the SA reception resource pool in each period;
   determining a location of a frequency domain resource in the location of the subframe $s_m^{SA_i}$ used for the SA transmission;
   determining, by the UE, a location of a frequency domain resource corresponding to a frequency domain resource index in a set $F_{SA}$ in the subframe for the $SA_i$ transmission according to a relationship between the frequency domain resource and the frequency domain resource index, for each $SA_i$; and
   detecting, by the UE, SA in the subframes of the SA reception resource pool according to the locations of the frequency domain resources,
   wherein i is an index number of SA, m is an index of the number of times that the $SA_i$ is transmitted, the set $F_{SA}$ is a set composed by resource elements (REs) used for the SA transmission in the subframe, and the set $F_{SA}$ comprises at least one frequency domain resources.

9. The method of claim 8, wherein the UE determines the period of the SA reception resource pool and the locations of the subframes in the SA reception resource pool in each period according to a configuration signaling received from a central control node, or according to pre-configuration, or according to pre-setting.

10. The method of claim 8, after determining the period of the SA reception resource pool and the locations of the subframes in the SA reception resource pool in each period and before determining the locations of the frequency domain resources used for the $SA_i$ transmissions, the method further comprising: determining, by the UE, an available TRP set; for a $TRP_j$ in the available TRP set, determining a location of a subframe for each $SA_j$ transmission for which the $TRP_j$ is used;
   detecting the $SA_j$ in the subframes indicated by the location of the subframe for each $SA_j$ transmission according to the locations of the frequency domain resources;
   wherein j is an index of SA.

11. The method of claim 10,
   wherein the set $F_{SA}$ comprises consecutive $F_f$ REs in $U_t$ symbols, the frequency domain resource comprises at least one SA resource units, and a SA resource unit comprises $U_f$ REs in all $U_t$ symbols in the $F_{SA}$, or the set $F_{SA}$ comprises consecutive $F_p$ PRBs, the frequency domain resource comprises at least one SA resource units, and a SA resource unit comprises $U_{SA}$ PRBs in the $F_{SA}$, wherein $F_p$ and $U_{SA}$ are pre-set positive integers, wherein for a $SA_j$ first transmission, the frequency domain resource index is determined by receiving an instruction from the central control node, or by independent selection by the UE, or according to the index of the $TRP_j$ and a configured mapping relationship between a time domain resource and a frequency domain resource, for a $SA_j$ retransmission, the frequency domain resource index corresponding to the frequency domain resource for a current $SA_i$ transmission is determined according to a frequency domain resource index determined for a previous $SA_j$ transmission and a configured resource-hopping way; or the frequency domain resource index corresponding to the frequency domain resource for the current $SA_j$ transmission is determined according to the index of the $TRP_j$ and the configured mapping rule between the time domain resource and the frequency domain resource, wherein the frequency domain resource index $n_{TRP_j}$ is determined as $n_{TRP_j} = (\tilde{n}_{TRP_j} + f_{hop}(i) \cdot Ns) \mod N_F$ according to the configured mapping relationship between the time domain resource and the frequency domain resource, wherein Ns is a fixed value pre-set or indicated by the central control node, $f_{hop}(j)$ is a frequency-hopping factor configured by the central control node or pre-set, $N_F$ is the number of TRPs using the subframe for the current $SA_j$ transmission as a transmission subframe, $\tilde{n}_{TRP_j}$ is a relative order of the $TRP_j$ after the $N_F$ TRPs are sorted in ascending order or in descending order of the indices of the $N_F$ TRPs, wherein $$f_{hop}(j) = \begin{cases} 0 & Ns = 1 \\ \left(\sum_{k=j \cdot 10+1}^{j \cdot 10+9} c(k) \times 2^{k-(j \cdot 10+1)}\right) \mod Ns & Ns = 2 \\ \left(\left(\sum_{k=j \cdot 10+1}^{j \cdot 10+9} c(k) \times 2^{k-(j \cdot 10+1)}\right) \mod(Ns-1) + 1\right) \mod Ns & Ns > 2 \end{cases}$$

wherein c(k) is a pseudo-random sequence ¬ defined in standards.

12. The method of claim 11, wherein in case that the resource for the $SA_j$ retransmission is determined according to the resource-hopping way or the mapping way between the time domain resource and the frequency domain resource, when the $SA_j$ is detected, combined detection is performed for frequency domain resources respectively in subframes indicated by the locations of the subframes for the $SA_j$ transmissions.

13. A Scheduling Assignment (SA) information transmitting apparatus in a device to device (D2D) communication, comprising:
   a resource pool determining module, to determine a period of a SA transmission resource pool and locations of subframes in the SA transmission resource pool in each period;
   a time-frequency resource location determining module, to determine a location of a subframe used for each $SA_i$ transmission in the SA transmission resource pool according to an index of a time resource pattern $TRP_i$, to determine a location of a frequency domain resource in the location of the subframe $s_m^{SA_i}$ used for the $SA_i$ transmission, and to determine a location of a frequency domain resource corresponding to a frequency domain resource index in a set $F_{SA}$ in the subframe for the $SA_i$ transmission according to a relationship between the frequency domain resource and the frequency domain resource index, for each $SA_i$; and a transmission module, to perform the $SA_i$ transmission according to the determined location of the subframe and the determined location of the frequency domain resource, wherein i is an index number of SA, m is an index of the number of times that the SA is transmitted, the set $F_{SA}$ is a set composed by resource elements (REs) used for the SA transmission in the subframe, and the set $F_{SA}$ comprises at least one frequency domain resources.

14. A Scheduling Assignment (SA) information receiving apparatus in a device to device (D2D) communication, comprising:

a resource pool determining module, to determine a period of a SA reception resource pool and locations of subframes in the SA reception resource pool in each period;

a time-frequency resource location determining module, to determine a location of a frequency domain resource in the location of the subframe $s_m^{SA_i}$ used for the $SA_i$ transmission, and to determine a location of a frequency domain resource corresponding to a frequency domain resource index in a set $F_{SA}$ in the subframe for the $SA_i$ transmission according to a relationship between the frequency domain resource and the frequency domain resource index, for each $SA_i$; and a detecting module, to detect SA in the subframes of the SA reception resource pool according to the locations of the frequency domain resources, wherein i is an index number of SA, m is an index of the number of times that the $SA_i$ is transmitted, the set $F_{SA}$ is a set composed by resource elements (REs) used for the SA transmission in the subframe, and the set $F_{SA}$ comprises at least one frequency domain resources.

* * * * *